US005586133A

United States Patent [19]

Sommargren

[11] Patent Number: 5,586,133
[45] Date of Patent: Dec. 17, 1996

[54] APPARATUS FOR INCREASING THE FREQUENCY DIFFERENCE AND STABILITY OF ORTHOGONALLY POLARIZED BEAMS FROM A ZEEMAN SPLIT LASER

[75] Inventor: Gary E. Sommargren, Santa Cruz, Calif.

[73] Assignee: Gary W. DeBell, Los Altos, Calif.

[21] Appl. No.: 500,393

[22] Filed: Jul. 10, 1995

[51] Int. Cl.$^6$ ........................................ H01S 3/13
[52] U.S. Cl. ............... 372/29; 372/37; 372/32; 372/33; 372/27; 372/69; 372/39
[58] Field of Search .................. 372/37, 29, 32, 372/33, 27, 92, 69, 39

[56] References Cited

U.S. PATENT DOCUMENTS

| | | | |
|---|---|---|---|
| 3,831,108 | 8/1974 | LeFloch | 372/37 |
| 3,889,207 | 6/1975 | Burgwald et al. | 372/37 |
| 4,397,025 | 8/1983 | Kebabian | 372/37 |
| 4,475,199 | 10/1984 | Sanderws et al. | 372/37 |
| 4,672,618 | 6/1987 | Wijntjes et al. | 372/37 |
| 4,779,279 | 10/1988 | Brown | 372/37 |
| 4,823,348 | 4/1989 | Hercher | 372/37 |
| 4,987,574 | 1/1991 | Rowley et al. | 372/37 |
| 5,014,278 | 5/1991 | Deki | 372/37 |

*Primary Examiner*—Leon Scott, Jr.
*Attorney, Agent, or Firm*—Wilson Sonsini Goodrich & Rosati

[57] ABSTRACT

The present invention is a laser with a high reflector mirror and an output coupler mirror defining a laser resonator having an optical axis and optical path length. A gain medium, with a first refractive index and a first Verdet constant, is positioned in the resonator. The laser also includes an apparatus to excite and cause a population inversion in the gain medium to produce an output laser beam. An optically transparent medium is positioned in the laser resonator. The optically transparent medium has a second refractive index and a second Verdet constant. The second Verdet constant is typically larger than the first Verdet constant. One or more permanent and electromagnets are positioned at least partially around the exterior of the laser resonator. The magnets apply an axial magnetic field to at least a portion of the gain medium and the optically transparent medium producing a Zeeman split in the gain medium and also producing an optical path length difference between left and right circular polarizations in the laser resonator in both the gain medium and the optically transparent medium. The output laser beam is split into left and right circularly polarized output laser beams with a finite difference frequency that can be tuned and stabilized to a predetermined value which is higher than current Zeeman split lasers. The optically transparent medium can be a solid, liquid or gas, and the laser can be, by way of illustration and without limitation, a He—Ne, ion, or semiconductor laser.

In embodiments, where the gain medium is a solid or liquid, the functions of the optically transparent medium are included in the gain medium.

24 Claims, 8 Drawing Sheets

APPARATUS FOR INCREASING THE FREQUENCY DIFFERENCE AND STABILITY OF ORTHOGONALLY POLARIZED BEAMS FROM A ZEEMAN SPLIT LASER

BACKGROUND OF THE INVENTION

1. Field of the Invention

The present invention relates to apparatus for simultaneously increasing the frequency difference and frequency difference stability of the two orthogonally polarized components of the beam from a Zeeman split laser. More particularly, the invention relates to an apparatus which is useful in a variety of interferometric optical measuring devices, which perform extremely accurate measurement of changes in optical path length at high slew rates.

2. Description of Related Art

The use of optical interferometry to measure changes in either length, distance or optical path has grown significantly due not only to technological advances in lasers, photodetectors and microelectronics but also due to an ever increasing demand for high precision and high accuracy measurements. Interferometers can be generally categorized into two types based on the signal processing used, i.e., either homodyne or heterodyne. The interferometers based on heterodyne techniques are generally preferred because they are insensitive to low frequency drift and noise and they can more readily have their resolution extended. Within the heterodyne type of interferometers of particular interest are the ones based on the use of two optical frequencies. The two optical frequencies are produced by one of the following techniques: (1) use of two longitudinal modes of a randomly polarized laser, see for example, J. B. Ferguson et al., "Single mode collapse in 6328Å He—Ne lasers", *Applied Optics*, vol. 17, pp. 2924–2929 (1978); (2) use of Bragg cells, see for example, Y. Ohtsuka et al., "Two-frequency laser interferometer for small displacement measurements in a low frequency range", *Applied Optics*, vol. 18, pp. 219–224 (1979); N. Massie et al., "Measuring laser flow fields with a 64-channel heterodyne interferometer", *Applied Optics*, vol. 22, pp. 2141–2151 (1983); and Sommargren, U.S. Pat. No. 4,684,828 issued Aug. 4, 1987; (3) use of a Zeeman split laser, see for example, Bagley et al., U.S. Pat. No. 3,458,259 issued Jul. 29, 1969; *Hewlett-Packard Journal* (August 1970); Bagley et al., U.S. Pat. No. 3,656,853 issued Apr. 18, 1972; and *Hewlett-Packard Journal* (April 1983).

The use of two longitudinal modes of a randomly polarized laser provides a laser beam with two orthogonally polarized frequencies in a rather convenient, cost-effective form. However, the frequency difference is approximately 600–1000 MHz which requires complicated, expensive detection and processing electronics. Furthermore, by starting with such a high frequency difference the task of resolution extension becomes difficult and expensive.

Bragg cells have been used to produce the two optical frequencies. However, the use of Bragg cells requires a complex, expensive apparatus which is susceptible to a number of sources of error and alignment difficulties.

A Zeeman split laser is the most elegant device to produce the two optical frequencies. To date practical considerations have limited this technique to a maximum frequency difference between the two optical frequencies to about 3 MHz. This imposes a limit on the maximum rate of change (slew rate) of the length, distance or optical path being measured. Another limitation of the Zeeman split laser is that the frequency difference is sensitive to the stability of externally applied magnetic fields which can very with time, location and orientation (e.g., the earth's magnetic field or magnetic fields produced by electrical currents in nearby electrical equipment). Instability of the difference frequency can degrade the accuracy of any measuring device which relies on the constancy of the difference frequency. Further, current Zeeman split lasers sacrifice laser power in order to achieve progressively higher difference frequencies.

While current techniques for producing two optical frequencies of orthogonal polarizations are useful for some applications, none provide the technical performance in a commercially viable form for applications requiring the measurement of rapidly changing lengths, distances or optical paths to extremely high resolution.

There is a need for a cost effective laser with two orthogonally polarized beam components that can be set to the predetermined value which can be significantly higher than the difference frequency from currently available Zeeman split lasers.

SUMMARY OF THE INVENTION

Accordingly, an object of the present invention is to provide a laser with two orthogonally polarized beam components that can be set to a predetermined value which can be higher than the difference frequency from currently available Zeeman split lasers.

This and other objects of the invention are achieved in a laser with a high reflector mirror and an output coupler mirror defining a laser resonator having an optical axis and optical path length. A gain medium, with a first refractive index and a first Verdet constant, is positioned in the resonator. The laser also includes an apparatus to excite and cause a population inversion in the gain medium to produce an output laser beam. In addition to the gain medium, an optically transparent medium is positioned in the laser resonator. The optically transparent medium has a second refractive index and a second Verdet constant. A magnet is positioned at least partially around the exterior of the laser resonator. The magnet applies an axial magnetic field to at least a portion of the gain medium and the optically transparent medium along the optical axis. In the gain medium this produces a Zeeman split and an optical path length difference between left and right circular polarizations along the optical axis in the laser resonator. In the optically transparent medium the axial magnetic field produces an additional optical path length difference between left and right circular polarizations. This causes the output laser beam to be split into left and right circularly polarized output laser beams with a finite difference frequency.

In another embodiment, the laser has a high reflector mirror and an output coupler mirror defining a laser resonator having an optical axis and optical path length. A solid or liquid gain medium is positioned in the resonator with a first refractive index and a first Verdet constant. An apparatus excites and causes a population inversion in the gain medium producing an output laser beam. A magnet is positioned at least partially around the exterior of the laser resonator to apply an axial magnetic field to at least a portion of the gain medium along the optical axis. In the gain medium this produces a Zeeman split and an optical path length difference between left and right circular polarizations in the laser resonator. This causes the output laser beam to be split into left and a right circularly polarized output laser beams with a finite difference frequency.

In the first embodiment, the gain medium can be a solid, liquid or gas. When the gain medium is a gas the Verdet constant of the optically transparent medium is at least two orders of magnitude greater than the Verdet constant of the gas. In the second embodiment, the gain medium is a solid and liquid. With the second embodiment, the required properties of the optically transparent medium are incorporated in the gain medium.

Preferably, the optically transparent medium is a transparent solid that is positioned in the resonator along its optical axis. The magnet, disposed at the exterior of the resonator, applies a strong magnetic field to the transparent solid with field lines generated along an axis of the resonator. This increases the relative refractive index in the optically transparent medium between left and right circularly polarized light by way of the magneto-optic Faraday effect, and increases the difference frequency between the two orthogonally polarized components of the output beam from the laser. A variable electro-magnet applies an additional magnetic field to the optically transparent medium, with field lines generated along the resonator's optical axis. This adjusts the relative refractive index in the optically transparent medium between left and right circularly polarized light by way of the magneto-optic Faraday effect, providing an ability to tune the difference frequency between the two orthogonally polarized components of the laser's output beam.

A second magnet can be positioned at least partially around the exterior of the laser resonator when a separate optically transparent medium is included. The second magnet supplies an axial magnetic field to at least a portion of the optically transparent medium. This results in an additional optical path length difference between left and right circular polarizations in the laser resonator. Thus, the finite difference frequency of the left and right circularly polarized output laser beams is increased.

A variable electro-magnet can be positioned at least partially around the exterior of the laser resonator. This applies an axial magnetic field to at least a portion of the optically transparent medium, or the gain medium if a separate optically transparent medium is not included, along the optical axis, resulting in an adjustable optical path length difference between left and right circular polarizations in the laser resonator.

Included with the laser are, (i) an apparatus to detect the relative intensities of the left and right circularly polarized laser beams, (ii) an apparatus to adjust the physical separation between the high reflector mirror and the output coupler mirror until the relative intensities are equal or at a predetermined ratio, (iii) an apparatus to detect the frequency difference of the left and right circularly polarized output laser beams, and (iv) an apparatus to adjust the magnetic field of the variable electro-magnet until the difference frequency is equal to a predetermined frequency.

DETAILED DESCRIPTION

The present invention is a laser with a high reflector mirror and an output coupler mirror defining a laser resonator having an optical axis and optical path length. A gain medium, with a first refractive index and a first Verdet constant, is positioned in the resonator. The laser also includes an apparatus to excite and cause a population inversion in the gain medium to produce an output laser beam. In addition to the gain medium, an optically transparent medium is positioned in the laser resonator. The optically transparent medium has a second refractive index and a second Verdet constant. The second Verdet constant is typically larger than the first Verdet constant. A magnet is positioned at least partially around the exterior of the laser resonator. The magnet applies an axial magnetic field to at least a portion of the gain medium and the optically transparent medium along the optical axis. In the gain medium this produces a Zeeman split and an optical path length difference between left and right circular polarizations along the optical axis in the laser resonator. In the optically transparent medium the axial magnetic field produces an additional optical path length difference between left and right circular polarizations. This causes the output laser beam to be split into left and right circularly polarized output laser beams with a finite difference frequency. The optically transparent medium can be a solid, liquid or gas, and the laser can be, by way of illustration and without limitation, a He—Ne, ion, or semiconductor laser.

Figure 1:
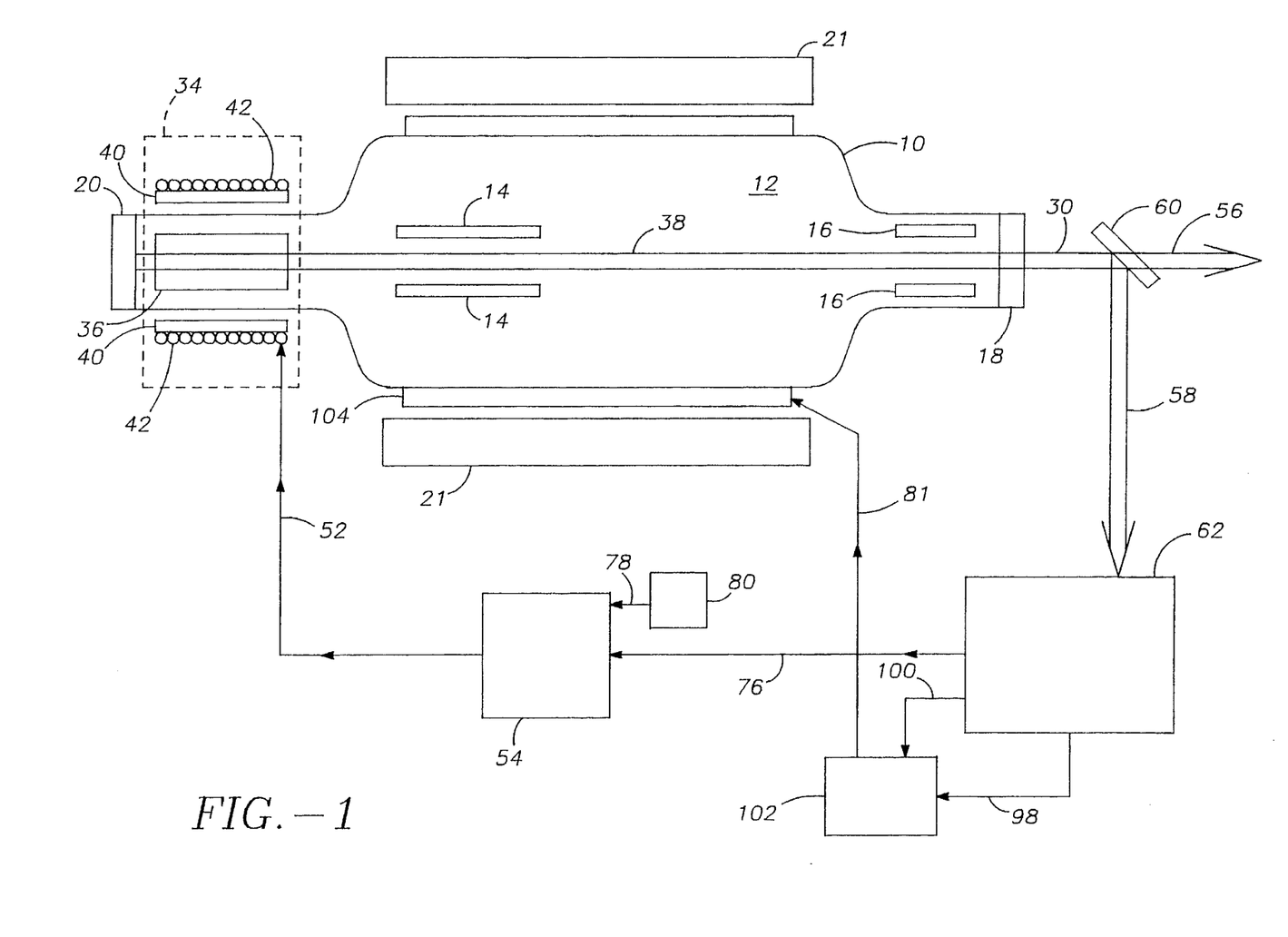
FIG. 1 depicts in schematic form an embodiment of the invention.

While the apparatus has application for a wide range of radiation sources, the following description is taken by way of example with respect to a Zeeman split gas laser. The term "radiation" as used herein includes, but is not limited to, electromagnetic radiation of all frequency ranges. FIG. 1 depicts in schematic form a preferred embodiment of the invention. The Zeeman split laser is comprised of a glass enclosure 10, a laser gain medium 12, electrodes 14 and 16, an output coupler mirror 18 and a high reflector mirror 20, and permanent magnet 21 which produces an axial magnetic field along the direction of laser beam 38 oscillating between output coupler mirror 18 and high reflector mirror 20.

Figure 2:
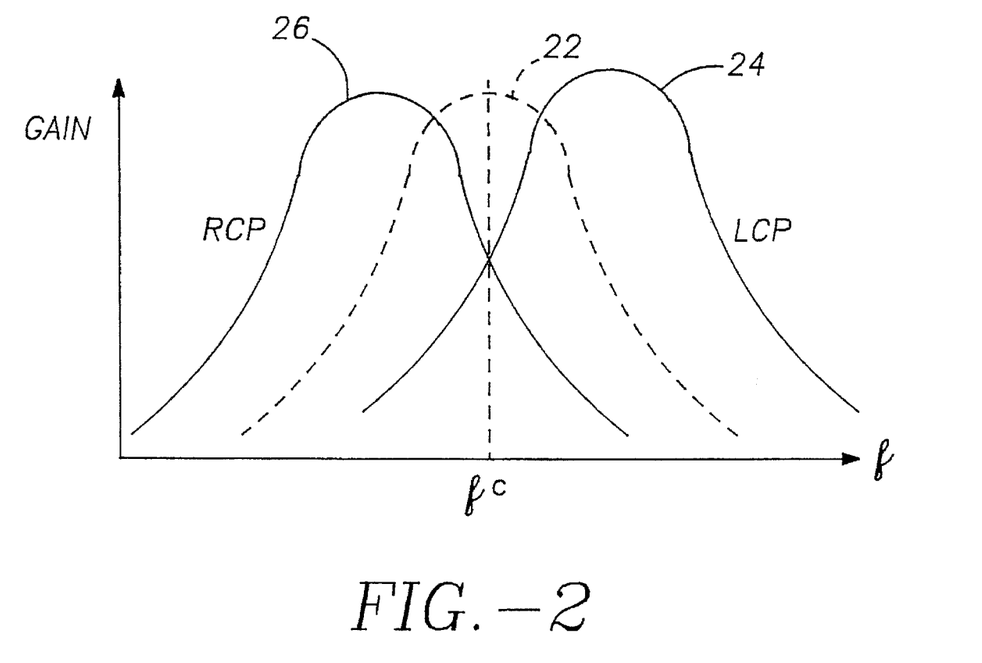
FIG. 2 shows a plot of the gain curve of the laser gain medium versus frequency and splitting of the gain curve (Zeeman effect) for left and right circularly polarized light due to application of a magnetic field in the laser gain medium along the axis of the laser resonator.
Figure 3:
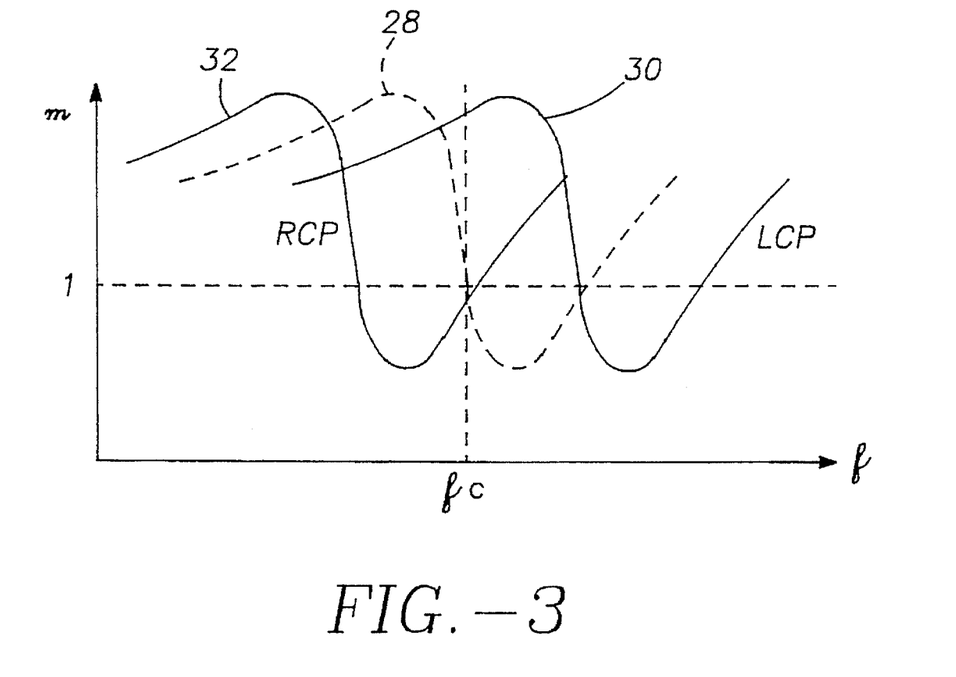
FIG. 3 shows a plot of the real part of the refractive index curve of the laser gain medium versus frequency and splitting of the curve (Faraday effect) for left and right circularly polarized light due to application of a magnetic field in the laser gain medium along the axis of the laser resonator.

The axial magnetic field has two effects on laser gain medium 12. Referring to FIG. 2, the applied magnetic field: (i) splits gain curve 22 about its central frequency, $f_c$, into two gain curves, the Zeeman effect, one for left circularly polarized light 24 and the other for right circularly polarized light 26; and (ii) referring now to FIG. 3, the real part of refractive index curve 28 is split into two curves, the Faraday effect, one for left circularly polarized light 30 and the other for right circularly polarized light 32.

The condition for laser oscillation is, $$2L\,n(f) = m\,c/f, \tag{1}$$

where:

L is the distance between output coupler mirror 18 and high reflector mirror 20;

n(f) is the refractive index of laser gain medium 12 at frequency f;

m is an integer; and c is the speed of light in a vacuum.

Figure 4:
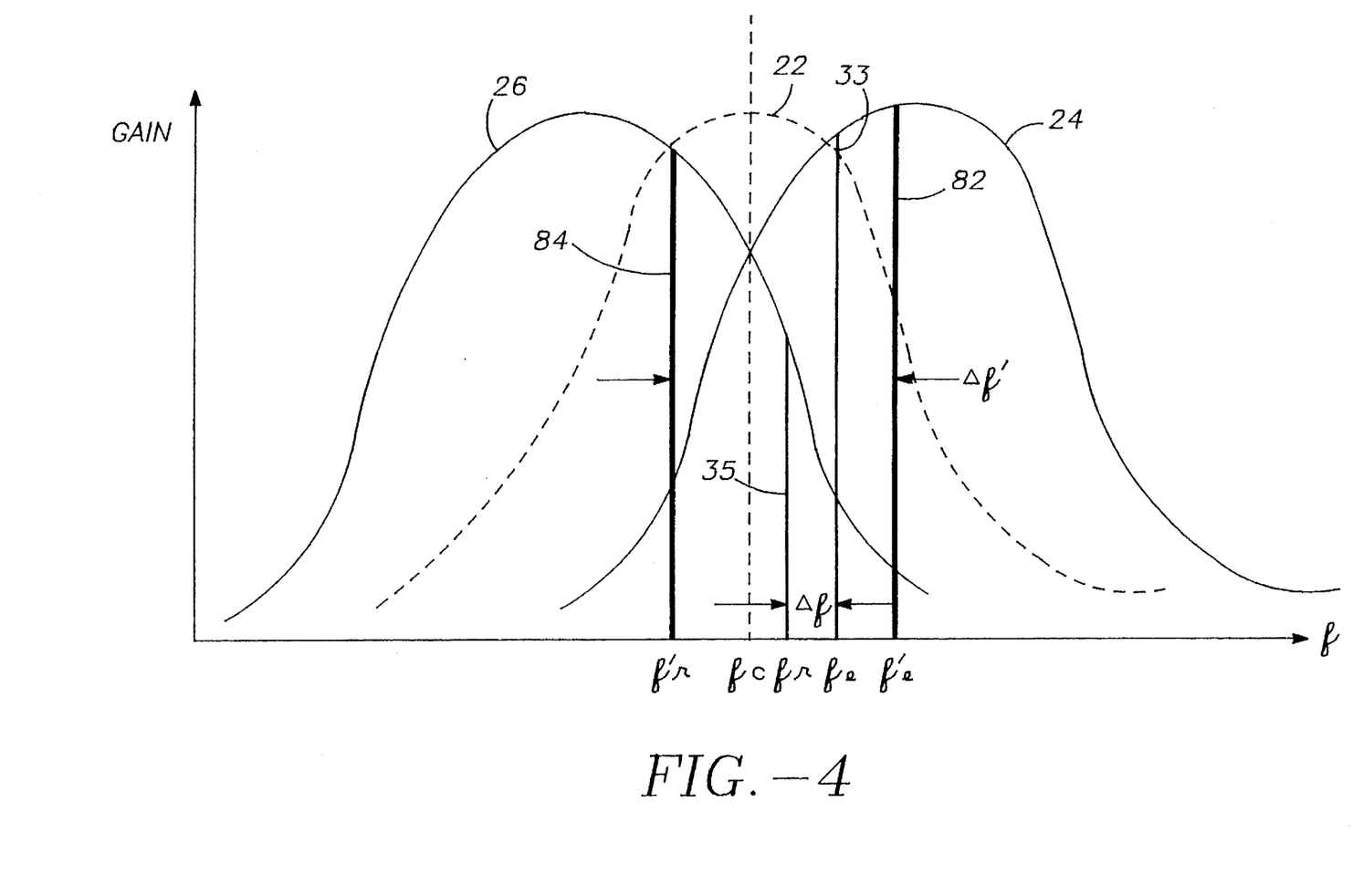
FIG. 4 shows a plot of the gain curves of the laser gain medium versus frequency and separation of the oscillating modes due to application of a magnetic field in the laser gain medium along the axis of the laser resonator.

Since laser gain medium 12 has a different refractive index for left and right circular polarizations, denoted by $n_l(f)$ and $n_r(f)$, respectively, the conditions for laser oscillation are:

left circular polarization, $$2L\,n_l(f_l) = m\,c/f_l;\ \text{and} \tag{2}$$

right circular polarization, $$2L\,n_r(f_r) = m\,c/f_r. \tag{3}$$

where $f_l$ and $f_r$ are the frequencies of oscillating modes 33 and 35 shown in FIG. 4.

The difference frequency, $\Delta f$, due to the Faraday effect in laser gain medium 12, is then:

$$\Delta f = f_l - f_r = (m\,c/2L)(1/n_l(f_l) - 1/n_r(f_r)). \tag{4}$$

Approximating $n_l(f_l)$ and $n_r(f_r)$ by $$n_l(f_l) = n(f) - \Delta n(f)/2 \tag{5}$$

and $$n_r(f_r) = n(f) + \Delta n(f)/2, \tag{6}$$

where $\Delta n(f)$ is the refractive index difference between the left and right circular polarizations, the difference frequency is, $$\Delta f = (m\,c/2L)(\Delta n(f)/n(f)^2) = f(\Delta n(f)/n(f)) \tag{7}$$

which is typically less than 3 MHz because $(\Delta n(f)/n(f))$ is small due to the small Verdet constant of laser gain medium 12. Additionally, the frequency difference is unstable due to spurious magnetic fields which can vary with time, location and orientation.

Returning again to FIG. 1, a magneto-optical apparatus 34 is placed in and around glass enclosure 10 to increase the frequency difference and permit active stabilization of the frequency difference. Magneto-optical apparatus 34 is comprised of: (i) optically transparent medium 36 placed in glass enclosure 10 between output coupler mirror 18 and high reflector mirror 20, and in oscillating laser beam 38; (ii) permanent magnet 40 placed outside glass enclosure 10 and surrounding optically transparent medium 36; and (iii) electro-magnet 42 placed around permanent magnet 40. Permanent magnet 40 and electro-magnet 42 produce an axial magnetic field along the direction of laser beam 38 oscillating between output coupler mirror 18 and high reflector mirror 20.

Figure 5:
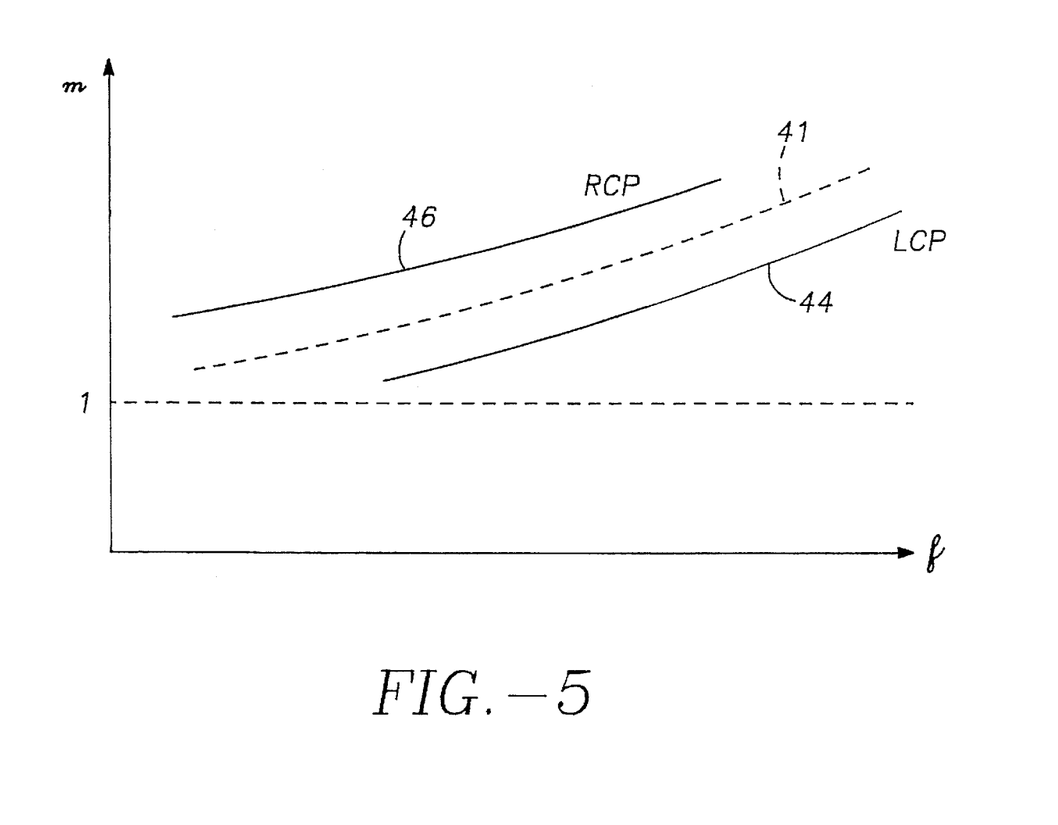
FIG. 5 shows a plot of the real part of the refractive index curve of the optically transparent medium versus frequency and splitting of the curve (Faraday effect) for left and right circularly polarized light due to application of a magnetic field in the optically transparent medium along the axis of the laser resonator.

As illustrated in FIG. 5, the axial magnetic field of permanent magnet 40 and electro-magnet 42 split the real part of refractive index curve 41 of optically transparent medium 36 into two curves (Faraday effect), one for left circularly polarized light 44 and the other for right circularly polarized light 46. Since optically transparent medium 36 has a different refractive index for left and right circularly polarizations, denoted by $n_l'(f')$ and $n_r'(f')$, respectively, the conditions for laser oscillation are now, left circular polarization, $$2[(L-L')n_l(f_l') + L'n_l'(f_l')] = m\,c/f_l'; \tag{8}$$

and right circular polarization, $$2[(L-L')n_r(f_r') + L'n_r'(f_r')] = m\,c/f_4' \tag{9}$$

where L' is the length of optically transparent medium 36 and $f_l'$ and $f_r'$ are the frequencies of oscillating modes 82 and 84 respectively, shown in FIG. 4.

Approximating $n_l'(f_l')$ and $n_r'(f_r')$ by $$n_l'(f_l') = n'(f) - \Delta n'(f)/2 \tag{10}$$

and $$n_r'(f_r') = n'(f) - \Delta n'(f)/2 \tag{11}$$

where $\Delta f'(f)$ is the refractive index difference between the left and right circular polarizations, the difference frequency, $\Delta f'$, due to the Faraday effect in both laser gain medium 12 and optically transparent medium 36, is now $$\Delta f' = f_l' - f_r' = \Delta f[1 + (\Delta n'(f)/\Delta n(f))(L'/L)] \tag{12}$$

Figure 6:
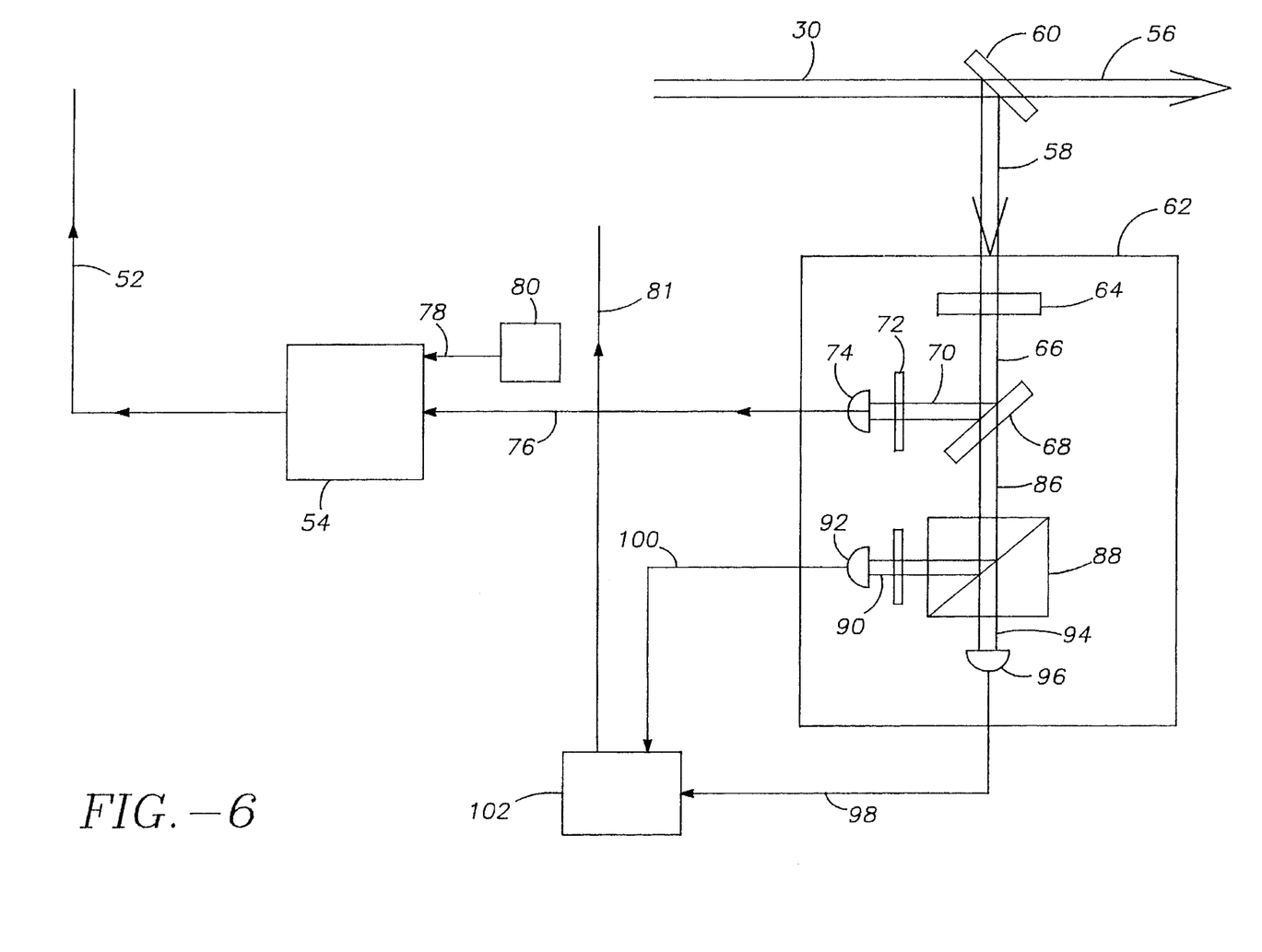
FIG. 6 depicts in schematic form the optical and electrical components needed to stabilize the absolute frequencies, $f_1'$ and $f_r'$ and the difference frequency, $\Delta f'$ of the laser's oscillating modes.

The first term is the contribution from laser gain medium 12 and the second term is the contribution from the optically transparent medium 36. Since the Faraday effect is many orders of magnitude stronger in optically transparent medium 36 than in laser gain medium 12, the second term can be significantly larger than the first term depending on the ratio, L'/L, and the strength of the magnetic field on optically transparent medium 36. For example, if the second term is equal to 4, then $\Delta f' = 5\,\Delta f$, which is five times higher than the Zeeman split laser without magneto-optical apparatus 34. The length, L', of optically transparent medium 36 and the magnetic field produced by permanent magnet 40 are chosen to give a desired frequency difference $f_O$. Electrical current 52 from feedback control circuit 54 to electro-magnet 42 is used to actively fine tune the magnetic field in optically transparent medium 36 so that difference frequency $\Delta f'$ is stabilized and equal to $f_O$. The tuning range provided by electro-magnet 42 is typically less than 1 MHz FIG. 6 depicts in schematic form the optical and electrical components needed to stabilize the absolute frequencies, $f_1'$ and $f_r'$, and the difference frequency, $\Delta f'$, of laser beam 56. A small portion of laser beam 30 is reflected as beam 58 by beamsplitter 60 and is incident on detector module 62 containing optical components and photodetectors. Beam 58 passes through quarter-wave retardation plate 64 which converts the two orthogonal circular polarizations into two orthogonal linear polarizations in beam 66. Beamsplitter 68 reflects a portion of beam 66 as beam 70 which passes through polarizer 72 onto photodetector 74. The axis of polarizer 72 is set midway between the directions of the two orthogonal polarizations so photodetector 74 detects the interference, and thus the frequency difference, between the two orthogonal polarization components of beam 70. Sinusoidal electrical signal 76 with frequency $\Delta f'$ from photodetector 74 is compared to the frequency of sinusoidal electrical signal 78 with frequency $f_o$ from frequency stabilized electronic oscillator 80 in feedback control circuit 54. Feedback control circuit 54 actively adjusts electrical current 52 to electro-magnet 42 to assure that $f_o - \Delta f' = 0$, thus setting and stabilizing the frequency difference $\Delta f'$.

The absolute frequencies, $f_l'$ and $f_r'$, of oscillating modes 82 and 84 in FIG. 4 are stabilized using a method similar to that described by Polanyi et al., U.S. Pat. No. 3,453,557 issued Jul. 1, 1969. The orthogonal linearly polarized components of beam 86 transmitted by beamsplitter 68 are separated by polarization beamsplitter 88 so that one polarization component is reflected as beam 90 to photodetector 92 while the other polarization component is transmitted as beam 94 to photodetector 96. Electrical signals 98 and 100 from photodetectors 96 and 92 are proportional to the intensities of beams 94 and 90 respectively. Comparator 102 compares the relative magnitudes of electrical signals 98 and 100, and actively adjusts electrical voltage 81 to device 104, shown in FIG. 1. Device 104, which may be a heater, piezoelectric or other means attached to glass enclosure 10, expands or contracts enclosure 10 in response to applied electrical voltage 81 thereby changing the spacing, L, between output coupler mirror 18 and high reflector mirror 20, and thus changes the absolute frequencies, $f_l'$ and $f_r'$, and hence, the intensities of oscillating modes 82 and 84. The absolute frequencies, $f_l'$ and $f_r'$, are stabilized by keeping the ratio of electrical signals 98 and 100 equal to unity or some other constant.

Figure 7:
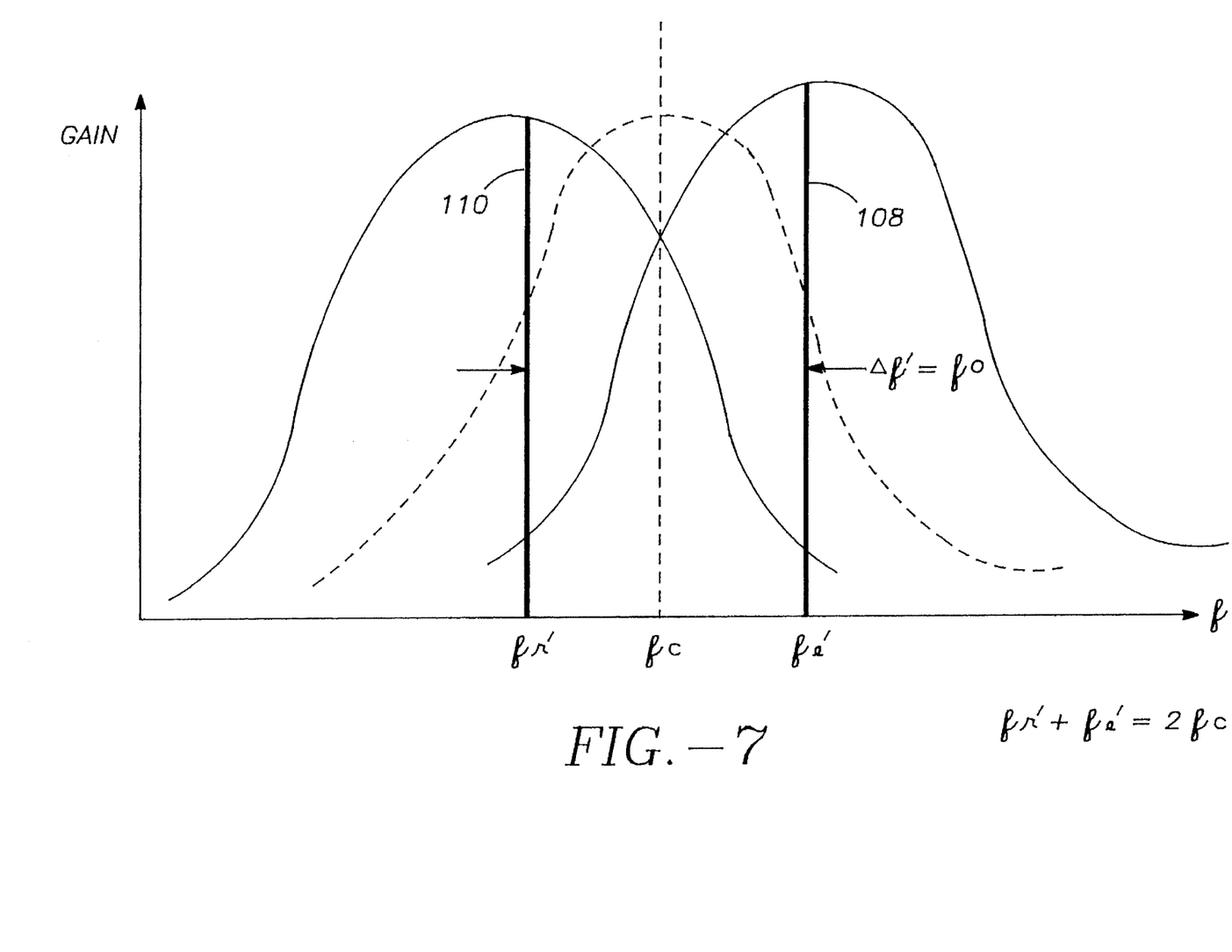
FIG. 7 is same as FIG. 4 with the additional constraints that the laser resonator length has been adjusted so that the intensity of the two oscillating modes are equal and that the current in the electro-magnet has been adjusted so that the difference frequency and the frequency of the stabilized electronic oscillator are equal.

FIG. 7 shows oscillating modes 108 and 110 of the laser when both the difference frequency is set and stabilized so that $f_o - \Delta f' = 0$, and the absolute frequencies, $f_l'$ and $f_r'$, are stabilized. Under this condition the sum frequency is stable.

Figure 8A:
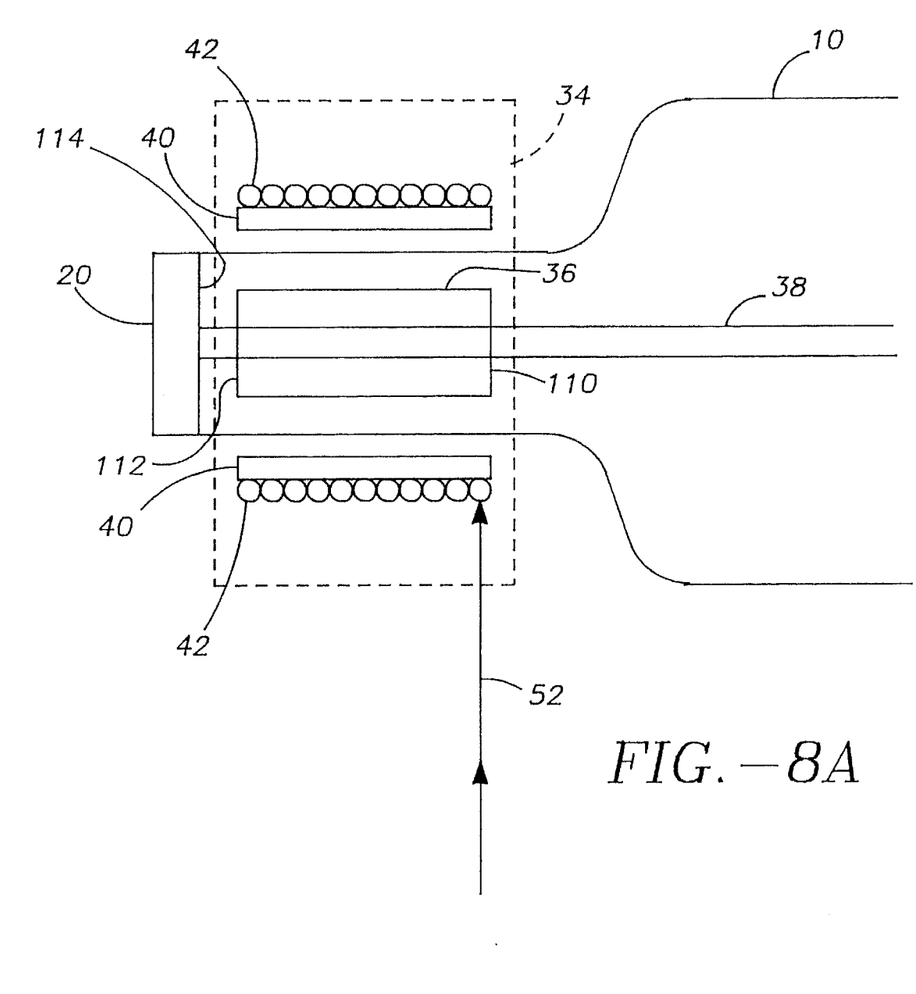
FIGS. 8a and 8b depict in detail the schematic form of the first and second embodiment of the magneto-optical apparatus consisting of the optically transparent medium and associated magnets.
Figure 8B:
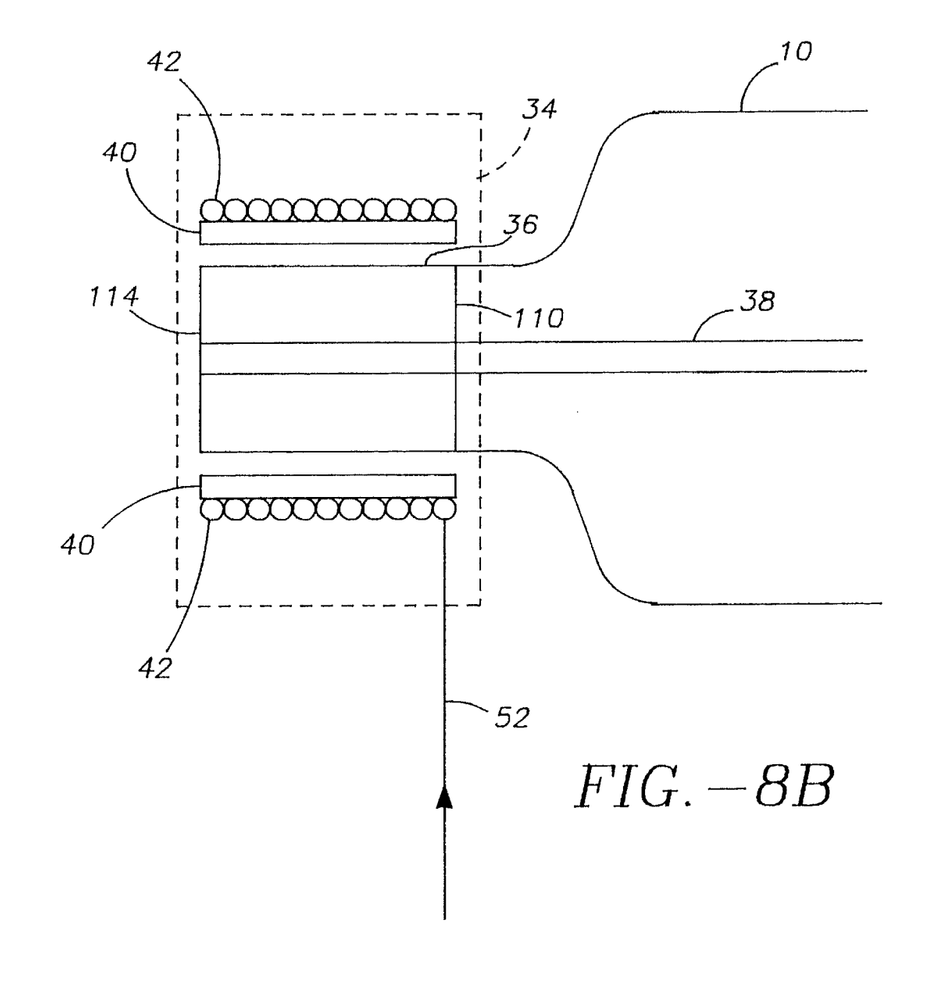

FIGS. 8a and 8b depict in schematic form two embodiments of magneto-optical apparatus 34. In FIG. 8a optically transparent medium 36 and high reflector mirror 20 are distinct components. Both end faces of optically transparent medium 36 are polished and coated with anti-reflection coatings 110 and 112 to eliminate reflection of laser beam 38. High reflector mirror 20 is coated with high reflection coating 114 to reflect virtually all of laser beam 38. In FIG. 8b, optically transparent medium 36 also serves as the high reflector mirror. Both end faces of optically transparent medium 36 are polished. The end face within glass enclosure 10 is coated with anti-reflection coating 110 to eliminate reflection of laser beam 38. The other end face is coated with high reflection coating 114 to reflect virtually all of laser beam 38.

In other embodiments, the gain medium is a solid or a liquid wherein the functions of the optically transparent medium may be included in the gain medium. In the case of a solid medium, the solid may be a semiconductor.

The laser of the present invention provides numerous advantages such as; (i) the difference frequency between the two orthogonally polarized beam components from the laser can be set to a predetermined value; (ii) the predetermined value can be significantly higher than the difference frequency from a Zeeman split laser; (iii) the difference frequency can be actively stabilized; and (iv) the higher difference frequency permits measurement of changing lengths, distances or optical paths with higher slew rates.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

I claim:

1. A laser, comprising:

a high reflector mirror and an output coupler mirror defining a laser resonator having an optical axis and optical path length;

a gain medium positioned in the resonator with a first refractive index and a first Verdet constant;

an apparatus to excite and cause a population inversion in the gain medium producing an output laser beam;

an optically transparent medium positioned in the laser resonator with a second refractive index and a second Verdet constant which is substantially the same or different from the first Verdet constant; and a first magnet positioned at least partially around the exterior of the laser resonator to apply an axial magnetic field to at least a portion of the gain medium and the optically transparent medium, the axial magnetic field being sufficient to split a gain curve of the gain medium into left and right circular polarizations resulting from a Zeoman effect and to induce an optical path difference between left and right circular polarizations in the laser resonator resulting from a Faraday effect that induces a change in the first and second refractive indices that is proportional to the first and second Verdet constants respectively, wherein the output laser beam is split into left and right circularly polarized laser output beams with a finite difference frequency.

2. The laser of claim 1, further comprising:

a second magnet positioned at least partially around the exterior of the laser resonator to apply an axial magnetic field to at least a portion of the optically transparent medium along the optical axis producing an additional optical path length difference between left and right circular polarizations in the laser resonator, wherein the finite difference frequency of the left and right circularly polarized output laser beams is increased.

3. The laser of claim 1, further comprising:

a variable electro-magnet positioned at least partially around the exterior of the laser resonator to apply an axial magnet field to at least a portion of the optically transparent medium along the optical axis producing an adjustable optical path length difference between left and right circular polarizations in the laser resonator, wherein the finite difference frequency of the left and right circularly polarized output laser beams is adjustable.

4. The laser of claim 3, further comprising:

an apparatus to adjust the magnetic field of the variable electro-magnet until the difference frequency is equal to a predetermined frequency.

5. The laser of claim 1, further comprising:

an apparatus to detect the relative intensities of the left and right circularly polarized laser beams.

6. The laser of claim 1, further comprising:

an apparatus to adjust the physical separation between the high reflector mirror and the output coupler mirror until the relative intensities are equal or at a predetermined ratio.

7. The laser of claim 1, further comprising:

an apparatus to detect the frequency difference of the left and right circularly polarized output laser beams.

8. The laser of claim 1, wherein the optically transparent medium is a gain medium.

9. The laser of claim 1, wherein the gain medium is a gas.

10. The laser of claim 9, wherein the Verdet constant of the optically transparent medium is greater than the Verdet constant of the gain medium.

11. The laser of claim 9, wherein the gain medium is helium-neon.

12. The laser of claim 1, wherein the gain medium is an ionized gas.

13. The laser of claim 1, wherein the gain medium is a liquid.

14. The laser of claim 13, wherein the Verdet constant of the optically transparent medium is greater than the Verdet constant of the gain medium.

15. The laser of claim 1, wherein the gain medium is a solid.

16. The laser of claim 15, wherein the Verdet constant of the optically transparent medium is greater than the Verdet constant of the gain medium.

17. A laser, comprising:

a high reflector mirror and an output coupler mirror defining a laser resonator having an optical axis and optical path length;

a solid or liquid gain medium positioned in the resonator with a refractive index and a Verdet constant;

an apparatus to excite and cause a population inversion in the gain medium producing an output laser beam;

a magnet positioned at least partially around the exterior of the laser resonator to apply an axial magnetic field to at least a portion of the gain medium, the axial magnetic field being sufficient to split a gain curve of the gain medium into left and right circular polarization components resulting from a Zeeman effect and to induce an optical path length difference between left and right circular polarizations in the laser resonator resulting from a Faraday effect that splits the refractive index into left and right circular polarization components in proportion to the Verdet constant, wherein the output laser beam is split into left and right circularly polarized output laser beams with a finite difference frequency.

18. The laser of claim 17, further comprising:

a variable electro-magnet positioned at least partially around the exterior of the laser resonator to apply an axial magnet field to at least a portion of the gain medium along the optical axis producing an adjustable optical path length difference between left and right circular polarizations in the laser resonator, wherein the finite difference frequency of the left and right circularly polarized output laser beams is adjustable.

19. The laser of claim 17, further comprising:

an apparatus to detect the relative intensities of the left and right circularly polarized laser beams.

20. The laser of claim 17, further comprising:

an apparatus to adjust the physical separation between the high reflector mirror and the output coupler mirror until the relative intensities are equal or at a predetermined ratio.

21. The laser of claim 17, further comprising:

an apparatus to detect the frequency difference of the left and right circularly polarized output laser beams.

22. The laser of claim 18, further comprising:

an apparatus to adjust the magnetic field of the variable electro-magnet until the difference frequency is equal to a predetermined frequency.

23. The laser of claim 17, wherein the gain medium is a semiconductor.

24. The laser of claim 17, wherein the apparatus to excite and cause a population inversion in the gain medium is a laser diode.

* * * * *